United States Patent
Ihlo et al.

(10) Patent No.: US 7,858,193 B2
(45) Date of Patent: Dec. 28, 2010

(54) LOW EMISSIVITY (LOW-E) THIN COATING STACKS WITH INTERMEDIATE ANTIDIFFUSION LAYERS

(75) Inventors: Lars Ihlo, Pfluckuff (DE); Uwe Schmidt, Falkenberg (DE); Ralf Comtesse, Wadgassen (DE); Heinz Schicht, Bethau (DE)

(73) Assignee: Saint Gobain Glass France, Courbevoie (FR)

( * ) Notice: Subject to any disclaimer, the term of this patent is extended or adjusted under 35 U.S.C. 154(b) by 0 days.

(21) Appl. No.: 12/064,391

(22) PCT Filed: Aug. 10, 2006

(86) PCT No.: PCT/FR2006/050797

§ 371 (c)(1),
(2), (4) Date: Aug. 19, 2008

(87) PCT Pub. No.: WO2007/042688

PCT Pub. Date: Apr. 19, 2007

(65) Prior Publication Data

US 2009/0186213 A1    Jul. 23, 2009

(30) Foreign Application Priority Data

Aug. 23, 2005    (DE) .................. 10 2005 039 707

(51) Int. Cl.
*B32B 17/06* (2006.01)

(52) U.S. Cl. .................. 428/432; 428/448; 428/701; 428/702

(58) Field of Classification Search .................. 428/426, 428/432, 448, 701, 702
See application file for complete search history.

(56) References Cited

U.S. PATENT DOCUMENTS

| 2003/0049464 A1 * | 3/2003 | Glenn et al. ................. 428/432 |
| 2005/0145480 A1 | 7/2005 | Neuman et al. |
| 2006/0240266 A1 * | 10/2006 | Schicht et al. ............... 428/426 |

FOREIGN PATENT DOCUMENTS

| EP | 0 678 484 | 10/1995 |
| EP | 1 538 131 | 6/2005 |
| EP | 1 630 142 | 3/2006 |
| FR | 2 641 271 | 7/1990 |
| FR | WO 2005/000578 | * 1/2005 |
| WO | 2004/013059 | 2/2004 |

OTHER PUBLICATIONS

U.S. Appl. No. 12/295,090, filed Sep. 29, 2008, Schicht, et al.

* cited by examiner

*Primary Examiner*—Gwendolyn Blackwell
(74) *Attorney, Agent, or Firm*—Oblon, Spivak, McClelland, Maier & Neustadt, L.L.P.

(57) ABSTRACT

In a heat-resistant low-emissivity (low-E) multilayer system that includes a silver layer as functional layer, for transparent substrates, in particular for window panes, which has, between the surface of the substrate and the silver layer, a high-refringence layer, in particular made of $TiO_2$, $Nb_2O_5$ or $TiNbO_x$, and, immediately below the silver layer, a layer essentially consisting of ZnO, a mixed oxide layer with a thickness of at least 0.5 nm, made of $NiCrO_x$ or $InSnO_x$ (ITO) that serves as antiscattering layer is placed between the high-refringence layer and the ZnO layer.

12 Claims, No Drawings

LOW EMISSIVITY (LOW-E) THIN COATING STACKS WITH INTERMEDIATE ANTIDIFFUSION LAYERS

CROSS-REFERENCE TO RELATED APPLICATIONS

The present application is a 35 U.S.C. §371 National Stage patent application of International patent application PCT/FR06/050797, filed on Aug. 10, 2006, which claims priority to German patent application DE 102005039707.7, filed on Aug. 23, 2005.

The invention relates to a heat-resistant low-emissivity multilayer system for transparent substrates, in particular for windows, which has the features as disclosed herein.

It comprises a lower antireflection coating having a highly refringent layer with in particular a $TiO_2$, $Nb_2O_5$ or $TiNbO_x$ layer and a wetting layer essentially consisting of ZnO, to which a silver-based functional layer is joined, with a barrier layer on top of this silver layer, an upper antireflection coating consisting of a layer or several partial layers and a cover coating consisting of a layer or several partial layers, another metal oxide layer that serves as antiscattering layer being placed in the lower base antireflection coating between the high-refringence layer and the ZnO layer.

Multilayer systems that are suitable for thermal bending and/or toughening operations carried out on glass panes, in which the ZnO-based wetting layer is immediately adjacent a $TiO_2$ layer are disclosed, for example, by document DE 197 26 966 and document DE 198 50 023. However, it turns out that, after the toughening operation, the proportion of light scattered by these multilayer systems is relatively high. As probable cause, it is assumed in document EP 1 538 131 that, during the toughening operation, diffusion processes via which the $TiO_2$ layer is destroyed take place on the boundary surface between $TiO_2$ and ZnO. It may also be hypothesized that, at high temperature, $Zn_2TiO_4$ is formed by diffusion processes on the boundary surface and that, in the crystalline state, this may be the cause of the high proportion of scattered light.

To inhibit these diffusion processes, document EP 1 538 131 proposes to place an $SnO_2$ antiscattering layer between the high-refringence layer and the ZnO layer. The high-refringence layer will thus be protected during the toughening operation, so that the high refractive index of this layer may be fully used, even after the toughening operation.

Although a considerable reduction in the proportion of scattered light is observed when an $SnO_2$ antiscattering layer is provided, this proportion is however always quite high. Moreover, the emissivity does not reach the desired low values.

The invention is based on a heat-resistant multilayer system that has the fundamental structure mentioned above. The problem at the basis of the invention is how to further improve the properties of such a multilayer system, and in particular to further decrease the proportion of scattered light after the toughening operation, to further increase the transmission in the visible range, to further reduce the surface resistance, and therefore the emission values, and to achieve values that are as high as possible within the infrared radiation range.

According to the invention, this problem is solved with the features as disclosed herein.

The heat-resistant low-E multilayer system for transparent substrates, in particular for window panes, according to the invention has a lower antireflection coating having a high-refringence layer, a wetting layer consisting essentially of ZnO to which a silver-based functional layer is joined, a barrier layer over the functional layer, an upper antireflection coating consisting of a layer or several partial layers and a cover coating consisting of a layer or several partial layers, another metal oxide layer that serves as antiscattering layer being placed in the lower antireflection coating between the high-refringence layer and the wetting layer. The antiscattering layer located between the high-refringence layer and the wetting layer is a mixed oxide layer with a thickness of at least 0.5 nm, made of $NiCrO_x$ or $InSnO_x$ (ITO).

The term "high-refringence layer" within the context of the present invention is understood to mean a layer whose optical index is at least equal to 2.2. This layer is preferably a non-nitride layer, and in particular an oxide layer.

Preferred compositions of the multilayer system and the preferred thickness ranges of the individual layers will be given in the disclosure as herein set forth and illustrative examples that follow.

In particular, the high-refringence layer is, preferably, made of $TiO_2$, $Nb_2O_5$ or $TiNbO_x$.

Moreover, the high-refringence layer is placed directly on the surface of the glass or a dielectric layer, the refractive index n of which is smaller—i.e. less than 2.2, while still being preferably greater than 1.8—than the refractive index of the high-refringence layer that follows, is placed between the surface of the glass and the high-refringence layer, in particular when the high-refringence layer is made of $TiO_2$, $Nb_2O_5$ or $TiNbO_x$. In this case, this dielectric layer placed between the surface of the glass and the high-refringence layer preferably consists of $SnO_2$, ZnO, $SiO_2$ or $Si_3N_4$.

Preferably, the barrier layer is a metal layer or a layer of a lightly hydrogenated titanium alloy consisting of 50 to 80 wt % Ti and 20 to 50 wt % Al.

In one particular variant, the heat-resistant low-E multilayer system for transparent substrates, in particular for window panes, according to the invention has a lower antireflection coating having a high-refringence layer, a wetting layer consisting essentially of ZnO to which a silver-based functional layer is joined, a barrier layer over the functional layer, an upper antireflection coating consisting of a layer or several partial layers and a cover coating consisting of a layer or several partial layers, another metal oxide layer that serves as antiscattering layer being placed in the lower antireflection coating between the high-refringence layer and the wetting layer, the antiscattering layer located between the high-refringence layer and the wetting layer being a mixed oxide layer with a thickness of at least 0.5 nm, made of $NiCrO_x$ or $InSnO_x$ (ITO).

In one advantageous variant, the multilayer system according to the invention has the following multilayer structure:

glass/$SnO_2$/$TiO_2$/$NiCrO_x$/ZnO:Al/Zn/Ag/TiAl ($TiH_j$)/ZnO:Al/$Si_3N_4$/$ZnSnSbO_x$/$Zn_2TiO_4$.

In another advantageous variant, the multilayer system according to the invention has the following multilayer structure:

glass/$SnO_2$/$TiO_2$/ITO/ZnO:Al/Zn/Ag/TiAl ($TiH_j$)/ZnO:Al/$Si_3N_4$/$ZnSnSbO_x$/$Zn_2TiO_4$.

The invention will be described in greater detail by means of two illustrative examples that are compared with two comparative examples of the prior art. Since the provisions according to the invention optimize particularly the optical and energy properties, the evaluation of the quality of the layers is based mainly on the measurements of the scattered light, the surface resistance and the emissivity. Consequently, to evaluate the properties of the layers, the measurements and tests given below were carried out on coated windows:

A. Measurement of the thickness (d) of the silver layer by X-ray fluorescence analysis;
B. Measurement of the scattered light (H) in % using a scattered light measurement instrument, from the company Gardner;
C. Measurement of the transmission (T) in % using a measurement instrument from the company Gardner;
D. Measurement of the electrical surface resistance (R) in $\Omega/\square$ using an FPP 5000 Veeco Instr. instrument and an SQOHM-1 manual measurement instrument; and
E. Measurement of the emissivity ($E_n$) in % using an MK2 measurement instrument from the company Sten Löfring.

After the emissivity is measured, the emissivity values are calculated using the surface resistance values through the formula $E_n=0.0106\times R$ (see H. -J. Gläser: "Dünnfilmtechnologie auf Flachglas [Thin-film technology on flat glass]", Verlag Karl Hofmann 1999, page 144) and the measured values of $E_n$ are compared with the calculated values $E^*_n$. The smaller the difference between the measured values $E_n$ and the calculated values $E^*_n$, the better the thermal stability of the multilayer system.

For each of the measurements, specimens measuring 40×50 cm cut from the central part of a coated window 4 mm in thickness are used. The specimens are heated to a temperature of 720 to 730° C. in a toughening furnace of the 47067 type from the company EFKO and then thermally toughened by suddenly cooling them in air. All the specimens undergo the same thermal stressing in this way.

It should also be pointed out that the multilayer system according to the invention achieves its best values, in terms of thermal insulation, infrared reflection and light transmission, on windows only after the heat treatment (toughening) of the substrates on which said system is deposited. The antiscattering layer also plays an essential role during the heat treatments. However, the multilayer system described here may be used commercially with slight thermal insulation and light transmission deficiencies even without having been heat treated, and therefore in particular on non-toughened windows, on plastic windows and also on films. The illustrative examples below however relate to all uses of the multilayer system on substrates consisting of thermally toughened glass windows.

COMPARATIVE EXAMPLE 1

A low-E multilayer system corresponding to the prior art (DE 102 35 154 B4) was deposited on float glass sheets 4 mm in thickness in an industrial continuous coating plant using the process of reactive magnetron sputtering, the numbers that follow the chemical symbols indicating the thickness of each layer in nm: glass/$SnO_2$ (18)/$TiO_2$ (10)/ZnO:Al (6)/Zn (1.5)/Ag (11.6)/TiAl (TiH$_l$) (2)/ZnO:Al (5)/$Si_3N_4$ (30)/$ZnSnSbO_x$ (3)/$Zn_2TiO_4$ (2).

The $TiO_2$ layer is deposited by sputtering from two tubular targets made of $TiO_x$ ceramic in a working gas consisting of an Ar/$O_2$ mixture, the addition of $O_2$ being about 3% by volume. The ZnO:Al layers were deposited by sputtering from a ZnAl metal target containing 2 wt % Al. The thin Zn metal film was deposited under unreactive conditions from the same target material. The barrier layer placed on the silver layer was deposited by reactive sputtering from a metal target in an Ar/$H_2$ (90/10 vol %) working gas mixture, the target containing 64 wt % Ti and 36 wt % Al. During the reactive sputtering, titanium hydride is formed, the degree of hydrogenation of which can be defined only with difficulty. If the bond is stoichiometric, the value of l is between 1 and 2.

The upper antireflection layer was deposited by reactive sputtering from an Si target in an Ar/$N_2$ working gas mixture.

The $ZnSnSbO_x$ lower cover layer was produced from a metal target consisting of a ZnSnSb alloy containing 68 wt % Zn, 30 wt % Sn and 2 wt % Sb in an Ar/$O_2$ working gas and the upper cover layer (top layer) was also deposited by reactive sputtering from a metal target consisting of a ZnTi alloy containing 73 wt % Zn and 27 wt % Ti.

The following values were determined on the toughened coated specimens of this comparative example:

| | |
|---|---|
| Thickness d of the silver layer: | 11.6 nm |
| Scattered light H: | 0.70% |
| Transmission T: | 87.2% |
| Surface resistance R: | 3.75 $\Omega/\square$ |
| Measured emissivity $E_n$: | 9.65% |
| Calculated emissivity $E^*_n$: | 3.97% |
| $E_n - E^*_n$: | 5.68%. |

The proportion of scattered light, which is 0.7%, considerably exceeds the still tolerable limit of 0.5%. Furthermore, a large difference is found between the measured value and the calculated value of the emissivity. Under oblique illumination by a halogen lamp, a thin (hazy) film is seen.

COMPARATIVE EXAMPLE 2

To continue the comparison, the multilayer system of document EP 1 538 131 as taught in comparative example 1 was provided with an $SnO_2$ antiscattering layer between the $TiO_2$ layer and the ZnO layer. This multilayer system therefore had the following structure:

glass/$SnO_2$ (18)/$TiO_2$ (10)/$SnO_2$ (5)/ZnO:Al (6)/Zn (1.5)/Ag (11.6)/TiAl (TiH$_l$) (2)/ZnO:Al (5)/$Si_3N_4$ (30)/$ZnSnSbO_x$ (3)/$Zn_2TiO_4$ (2).

The measurements carried out on the specimens thermally toughened under the same conditions as in comparative example 1 gave the following values:

| | |
|---|---|
| Thickness d of the silver layer: | 11.7 nm |
| Scattered light H: | 0.50% |
| Transmission T: | 87.0% |
| Surface resistance R: | 3.1 $\Omega/\square$ |
| Measured emissivity $E_n$: | 7.2% |
| Calculated emissivity $E^*_n$: | 3.3% |
| $E_n - E^*_n$: | 3.9%. |

Thanks to the arrangement of the $SnO_2$ antiscattering layer, the proportion of scattered light was considerably reduced compared with the above comparative example, but it was still 0.5%. A smaller difference was also observed between the measured value and the calculated value of the emissivity. At 3.9%, the difference was still relatively large, and it had to be concluded from this that the Ag layer still underwent considerable degradation during the toughening operation.

The insertion of the SnO$_2$ layer made the multilayer system generally more malleable, this being expressed by a greater scratch sensitivity and a greater tendency for surface damage during washing operations.

ILLUSTRATIVE EXAMPLE 1

A modified multilayer system according to the invention was produced on the same coating plant as that used for comparative examples 1 and 2, the system having the following structure:

glass/SnO$_2$ (18)/TiO$_2$ (10)/NiCrO$_x$ (2.5)/ZnO:Al (6)/Zn (1.5) /Ag (11.6)/TiAl (TiH$_l$) (2)/ZnO:Al (7)/Si$_3$N$_4$ (30)/ZnSnSbO$_x$ (3) /Zn$_2$TiO$_4$ (2).

The modification over comparative example 2 lay in the fact that, instead of an SnO$_2$ layer, an NiCrO$_x$ antiscattering layer was inserted between the TiO$_2$ layer and the ZnO layer. The suboxidized NiCrO$_x$ layer was deposited by sputtering from a flat metal target in DC mode and in an Ar/O$_2$ atmosphere, the O$_2$ content in the working gas being about 30% by volume.

The specimens were toughened in the same manner as the specimens of the comparative examples. The measurements carried out on the toughened coated specimens gave the following values:

| | |
|---|---|
| Thickness d of the silver layer: | 11.5 nm |
| Scattered light H: | 0.25% |
| Transmission T: | 89.1% |
| Surface resistance R: | 3.68 Ω/□ |
| Measured emissivity $E_n$: | 4.3% |
| | (4.0 to 4.6%) |
| Calculated emissivity $E^*_n$: | 3.9% |
| $E_n - E^*_n$: | 0.4%. |

The proportion of scattered light was therefore reduced to half that of comparative example 2. Likewise, the difference between the measured emissivity and the calculated emissivity became considerably smaller, thereby making it possible to conclude that the insertion of the NiCrO$_x$ layer made the silver layer considerably more stable during the toughening operation.

The behavior of the multilayer system in use was considerably improved, this being expressed by a substantially lower scratch sensitivity. Even when the toughening times were extended by 20%, no unfavorable effect was observed. This meant that the temperature resistance of the multilayer system was further improved. The multilayer system was optically shiny and even under oblique illumination using a halogen lamp no film (light haze) was seen.

ILLUSTRATIVE EXAMPLE 2

A modified multilayer system according to the invention was produced in the same coating plant as for the previous examples, this system having the following structure:

glass/SnO$_2$ (18)/TiO$_2$ (6)/ITO (2.5)/ZnO:Al (6)/Zn (1.5) /Ag (11.6)/TiAl (TiH$_l$) (2)/ZnO:Al (7)/Si$_3$N$_4$ (30)/ZnSnSbO$_x$ (3) /Zn$_2$TiO$_4$ (2).

The thin ITO antiscattering layer was deposited by sputtering from a flat ceramic target in an argon atmosphere to which no oxygen was added.

After the heating and toughening treatment, which took place under the same conditions as in the case of the previous examples, the following values were determined on the specimens:

| | |
|---|---|
| Thickness d of the silver layer: | 11.6 nm |
| Scattered light H: | 0.25% |
| Transmission T: | 89.1% |
| Surface resistance R: | 3.67 Ω/□ |
| Measured emissivity $E_n$: | 4.4% |
| | (4.2 to 4.6%) |
| Calculated emissivity $E^*_n$: | 3.9% |
| $E_n - E^*_n$: | 0.5%. |

Similarly, comparison with comparative example 2 shows that an ITO antiscattering layer according to the invention gives better results than an SnO$_2$ antiscattering layer.

The invention claimed is:

1. A heat-resistant low-E multilayer system for transparent substrates, wherein the multilayer system comprises a lower antireflection coating having a high-refringence layer, a wetting layer consisting essentially of ZnO to which a silver-based functional layer is joined, a barrier layer over the functional layer, an upper antireflection coating consisting of a layer or several partial layers and a cover coating layer or cover coating partial layers, another metal oxide layer that serves as an antiscattering layer and is located in the lower antireflection coating between the high-refringence layer and the wetting layer, wherein the antiscattering layer is a mixed oxide layer comprising NiCrO$_x$ or InSnO$_x$ (ITO) and having a thickness of at least 0.5 nm, wherein the antiscattering layer is in direct contact with the wetting layer.

2. The multilayer system as claimed in claim 1, wherein the high-refringence layer comprises TiO$_2$, Nb$_2$O$_5$ or TiNbO$_x$.

3. The multilayer system as claimed in claim 1 wherein the high-refringence layer is located directly on the surface of the transparent substrate.

4. The multilayer system as claimed in claim 1 wherein a dielectric layer, which has a refractive index n that is smaller than the refractive index of the high-refringence layer, is located between the surface of the transparent substrate and the high-refringence layer.

5. The multilayer system as claimed in claim 4, wherein the dielectric layer consists of SnO$_2$, ZnO, SiO$_2$ or Si$_3$N$_4$.

6. The multilayer system as claimed in claim 1, wherein the barrier layer is a metal layer or a layer of a lightly hydrogenated titanium alloy consisting of 50 to 80 wt % Ti and 20 to 50 wt % Al.

7. The multilayer system as claimed in claim 1, wherein the multilayer system comprises the following multilayer structure:

glass/SnO$_2$/TiO$_2$/NiCrO$_x$/ZnO:Al/Zn/Ag/TiAl(TiH$_l$)/ ZnO:Al/Si$_3$N$_4$/ZnSnSbO$_x$/Zn$_2$TiO$_4$.

8. The multilayer system as claimed in claim 1, wherein the multilayer system comprises the following multilayer structure:

glass/SnO$_2$/TiO$_2$/ITO/ZnO:Al/Zn/Ag/TiAl(TiH$_l$)/ZnO: Al/Si$_3$N$_4$/ZnSnSbO$_x$/Zn$_2$TiO$_4$.

9. The multilayer system as claimed in claim 1, wherein the transparent substrate is glass.

10. The multilayer system as claimed in claim 1, wherein the transparent substrate is a glass window.

11. The multilayer system as claimed in claim 1, wherein the transparent substrate is plastic.

12. The multilayer system as claimed in claim 1, wherein the transparent substrate is a plastic window.

* * * * *